United States Patent

[11] 3,586,990

[72] Inventor Gideon Willoner
North Vancouver, British Columbia, Canada
[21] Appl. No. 872,719
[22] Filed Oct. 30, 1969
[45] Patented June 22, 1971
[73] Assignee GTE Automatic Electric Laboratories, Incorporated
Northlake, Ill.

[54] LOW-PASS ACTIVE PARALLEL-T FILTER WITH ZERO SOURCE IMPEDANCE

2 Claims, 1 Drawing Fig.

[52] U.S. Cl. .......... 330/107, 330/109
[51] Int. Cl. .......... H03f 1/36
[50] Field of Search .......... 330/21, 31, 28, 103, 107, 109; 331/110, 142

[56] References Cited
UNITED STATES PATENTS
3,370,247 2/1968 Hoffman et al. .......... 330/109

Primary Examiner—Roy Lake
Assistant Examiner—James B. Mullins
Attorneys—Cyril A. Krenzer, K. Mullerheim, B. E. Franz and Glenn H. Antrim

ABSTRACT: The input of the capacitive series arm contains two capacitors to function as the first series capacitor and also as an input voltage divider, the divider being connected between a source of input signal and the capacitive series arm to provide low-pass characteristics. Compared with low-pass filters using resistive voltage dividers, the resistance between the series capacitors and the source of input signal is low, and therefore the series capacitive arm has true reactance.

"PRIOR ART"

INVENTOR
GIDEON WILLONER
BY Glenn H. Antrim
ATTORNEY

LOW-PASS ACTIVE PARALLEL-T FILTER WITH ZERO SOURCE IMPEDANCE

BACKGROUND OF THE INVENTION

This invention pertains to electrical wave filters and particularly to input circuits of capacitive arms of parallel-T networks having low-pass characteristics.

The low-pass filter of this invention is an improvement on active low-pass filters of the type shown in FIG. 1 of the accompanying drawing which correspond to the low-pass filter shown and described in U.S. Pat. No. 3,473,142 issued to Jose Luis Herrero and Gideon Willoner on Oct. 14, 1969. Low-pass filters of this type are like conventional parallel-T filters in that each section has a resistive series arm and a capacitive series arm except they are modified such that input voltage is divided so that full signal voltage is applied only to the resistive arm and a fraction of the signal voltage is applied to the capacitive arm. In order that the input of a prior, active low-pass filter can be connected to a single terminal of a source of signal, a resistive voltage divider is connected to the input circuit of the capacitive arm. The values of the resistors in the voltage divider are low so that good attenuation of signal outside the passband is obtained. Nevertheless, the resistance is sufficient to prevent the series capacitors from functioning to the fullest extent as true reactors.

SUMMARY OF THE INVENTION

The series capacitor connected to the source of signal and having the value usually designated C has been omitted, and in its place two capacitors having different values computed in terms of C have been added. These capacitors are effectively connected in series for the input signal to function as voltage divider but are connected effectively in parallel through low impedance of the source of signal to function as a usual series capacitor with the value C in the capacitive arm. With this arrangement, the characteristics of the filter are the same as the characteristics of a filter having each arm connected to a source with substantially zero impedance.

DESCRIPTION OF THE PREFERRED EMBODIMENT

Figure 1:
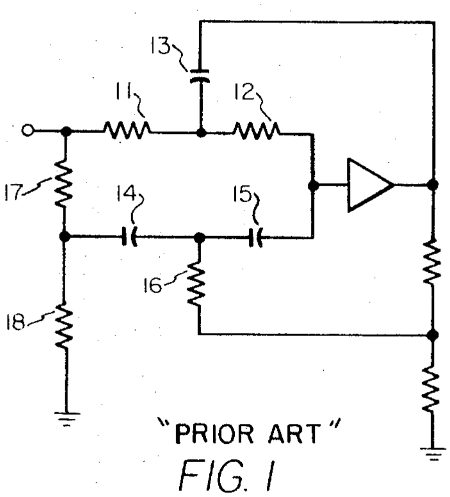
FIG. 1 is a schematic diagram of a known form of low-pass active parallel-T filter having a resistive voltage divider in the input of its capacitive arm.
Figure 2:
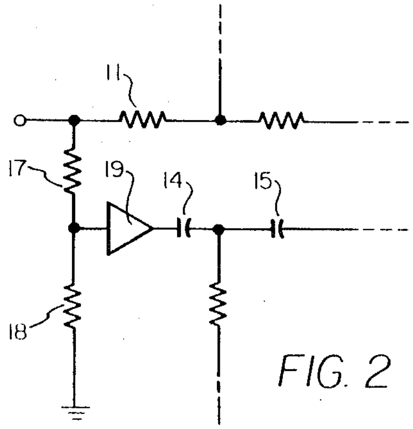
FIG. 2 is a simplified schematic diagram to aid in the understanding of the need of this invention.

The preferred embodiment will be better understood with reference to the prior circuit of FIG. 1 and its modification of FIG. 2. The network of FIG. 1 has a usual resistive series arm comprising resistors 11 and 12 and a shunt capacitor 13, and a capacitive series arm comprising the capacitors 14 and 15 and a shunt resistor 16. As described in the U.S. Pat. No. 3,473,142 mentioned above, the output of the parallel-T network is connected through a buffer amplifier to feedback circuits connected to the shunt capacitor 13 and the shunt resistor 16.

To obtain low-pass characteristics, the input of the capacitive series arm is connected to the intermediate tap of a voltage divider comprising resistors 17 and 18 in series across the input of the filter. The values of these resistors determine K, the ratio of the voltage applied to the capacitive arm to the voltage applied to the resistive arm. Where $R_{17}$ and $R_{18}$ are the resistance values of the resistors 17 and 18 respectively, $K=R_{18}(R_{17}+R_{18})$. The desired ratio $K$ is obtained by this arrangement, but sine the resistance of the signal source in the capacitive arm is $R_{17}R_{18}/(R_{17}+R_{18})$, the series capacitors do not have the true reactance that they have in a filter supplied signal from a source with zero impedance.

In order to provide the desired low impedance at the input of the capacitive arm, a buffer amplifier 19 with a gain of one and with output impedance of substantially zero may be connected between the tap of the voltage divider comprising the resistors 17 and 18 and the input of the capacitive arm as shown in FIG. 2. With this arrangement, the network performs satisfactorily, but it has disadvantages in that the use of the amplifier 19 increases the cost of the network, and the resistors 17 and 18 decrease the direct current bias voltage available from an input circuit for the amplifier so that additional biasing circuits may be required.

Figure 3:
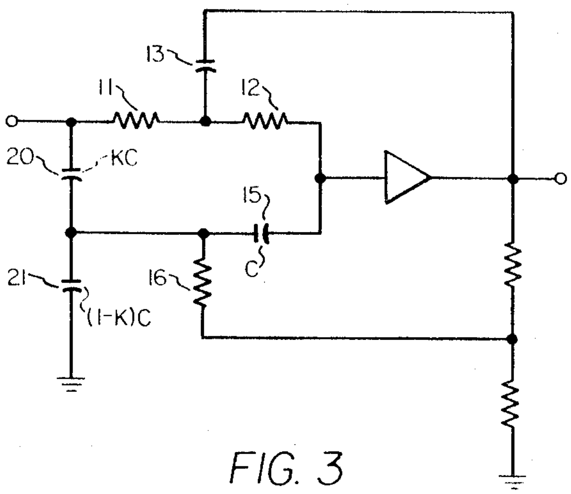
FIG. 3 is a schematic diagram of a preferred low-pass active parallel-T filter having a capacitive voltage divider that also functions as a first series capacitor.

In the preferred circuit of FIG. 3, the resistive voltage divider at the input of the capacitive arm of the parallel-T network is eliminated, and the ratio $K$ is determined by the use of a capacitive voltage divider. Capacitors 20 and 21 are connected in series between the input terminals of the network and the junction of these capacitors is connected to the capacitor 15 and the resistor 16 at a point that corresponds to the usual center point of a capacitive arm of a parallel-T filter.

Values of the capacitors 20 and 21 are chosen as required to provide the usual value C corresponding to the capacitance of the capacitor 15 in a parallel-T filter and to provide $K$, the ratio of the input voltage applied to the capacitive series arm to the input voltage applied to the resistive series arm. Providing the impedance of the source of the input signal is zero, the capacitors 20 and 21 appear to be connected in parallel with respect to the center point of the capacitive arm. Let the capacitance of the capacitors 20 and 21 be $C_{20}$ and $C_{21}$ respectively, and C be the value of each of the usual series capacitors, then $C=C_{20}+C_{21}$. Also, with respect to the input circuit, $K=C_{20}/(C_{20}+C_{21})$. Solving these equations, the values of the capacitors related to the value $C$ are: $C_{20}=KC$ and $C_{21}=(1-K)C$.

Through the use of these values, the low-pass characteristics of a filter having its input connected to a single terminal of a low-impedance source of input signal are the same as for a filter having the inputs of conventional capacitive and resistive series arms connected to separate low-impedance terminals to supply a desired ratio of input signal voltage to the arms. A single input facilitates cascading of filters having output buffer amplifiers with low output impedance.

I claim:

1. An active parallel-T filter of the type having a resistive series arm and capacitive series arm, each of said arms having a usual respective shunt element, a buffer amplifier connected between the outputs of said arms and at least one of said shunt elements, said filter having a single input to be connected to a source of signal voltage, said filter being modified to obtain low-pass characteristics in that it has voltage dividing means to apply to said capacitive series arm a desired fraction of said signal voltage applied to the input of said resistive series arm, the improvement comprising first and second input capacitors substituted for a first series capacitor of said capacitive series arm, said capacitive series arm having a second series capacitor of the usual value $C$, said first input capacitor being connected between said input of said resistive series arm and the junction connecting said second series capacitor and a respective one of said shunt elements, said second input capacitor being connected between a common circuit terminal and the junction connecting said first input capacitor, said second series capacitor and said respective shunt element, and said input capacitors functioning as said voltage dividing means in addition to functioning as a first series capacitor.

2. In a filter as claimed in claim 1 wherein said first input capacitor has a value $KC$ and said second input capacitor has a value $(1-K)C$ where $K$ is the ratio of the voltage applied to the input of said capacitive series arm to the voltage applied to the input of said resistive series arm.